(12) United States Patent
Maguire et al.

(10) Patent No.: US 8,895,171 B2
(45) Date of Patent: Nov. 25, 2014

(54) SYSTEM FOR COOLING A VEHICLE BATTERY AND METHOD OF INSTALLING SAME

(75) Inventors: Patrick Daniel Maguire, Ann Arbor, MI (US); Sarav Paramasivam, South Lyon, MI (US); Jeffrey Joseph Omichinski, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1587 days.

(21) Appl. No.: 11/876,965

(22) Filed: Oct. 23, 2007

(65) Prior Publication Data

US 2009/0104511 A1    Apr. 23, 2009

(51) Int. Cl.
*H01M 10/50*    (2006.01)
*H01M 10/625*    (2014.01)
*B60L 11/18*    (2006.01)
*H01M 10/613*    (2014.01)
*H01M 10/6563*    (2014.01)
*H01M 10/6566*    (2014.01)

(52) U.S. Cl.
CPC ........ *H01M 10/5004* (2013.01); *Y02T 10/7005* (2013.01); *H01M 10/5016* (2013.01); *Y02E 60/12* (2013.01); *B60L 11/1877* (2013.01); *B60L 11/1874* (2013.01); *H01M 10/5073* (2013.01); *Y02T 10/705* (2013.01); *H01M 10/5067* (2013.01)
USPC ........ 429/120; 180/68.1; 180/68.2; 180/68.5; 180/178; 361/688; 361/694; 361/728

(58) Field of Classification Search
CPC .................... H01M 10/5004; H01M 10/5016; B60L 11/1874
USPC ......... 429/120; 180/168.1–5, 68.2, 68.5, 178; 361/688, 694, 728
See application file for complete search history.

(56) References Cited

U.S. PATENT DOCUMENTS

| | | | |
|---|---|---|---|
| 4,312,418 A | 1/1982 | Rittman | |
| 5,082,075 A * | 1/1992 | Karolek et al. | 180/68.2 |
| 5,520,258 A | 5/1996 | Kemshall | |
| 5,722,250 A * | 3/1998 | Pomme | 62/244 |
| 6,541,151 B2 | 4/2003 | Minamiura et al. | |
| 6,613,472 B1 | 9/2003 | Watanabe | |
| 6,662,891 B2 | 12/2003 | Misu et al. | |
| 6,798,658 B2 | 9/2004 | Takedomi et al. | |
| 7,025,159 B2 | 4/2006 | Smith et al. | |
| 2004/0226765 A1* | 11/2004 | Mathews et al. | 180/68.5 |
| 2006/0116062 A1* | 6/2006 | Smith et al. | 454/69 |
| 2007/0091560 A1* | 4/2007 | Parker | 361/687 |
| 2008/0060860 A1* | 3/2008 | Murase et al. | 180/65.3 |
| 2009/0061289 A1* | 3/2009 | Hamada et al. | 429/53 |

FOREIGN PATENT DOCUMENTS

| | | |
|---|---|---|
| CN | 2111565 U | 7/1992 |
| EP | 1207581 A1 | 5/2002 |
| JP | 2007099149 A | 4/2007 |

* cited by examiner

*Primary Examiner* — Ladan Mohaddes
(74) *Attorney, Agent, or Firm* — David B. Kelley; Brooks Kushman P.C.

(57) ABSTRACT

Prior to loading into a vehicle, a duct is attached to a battery such that the duct is moveable between a loading position and a post-loading position. Before the battery and duct are loaded into the vehicle, the duct is positioned in the loading position. After the battery and duct are loaded into the vehicle, the duct is positioned in the post-loading position and secured.

15 Claims, 4 Drawing Sheets

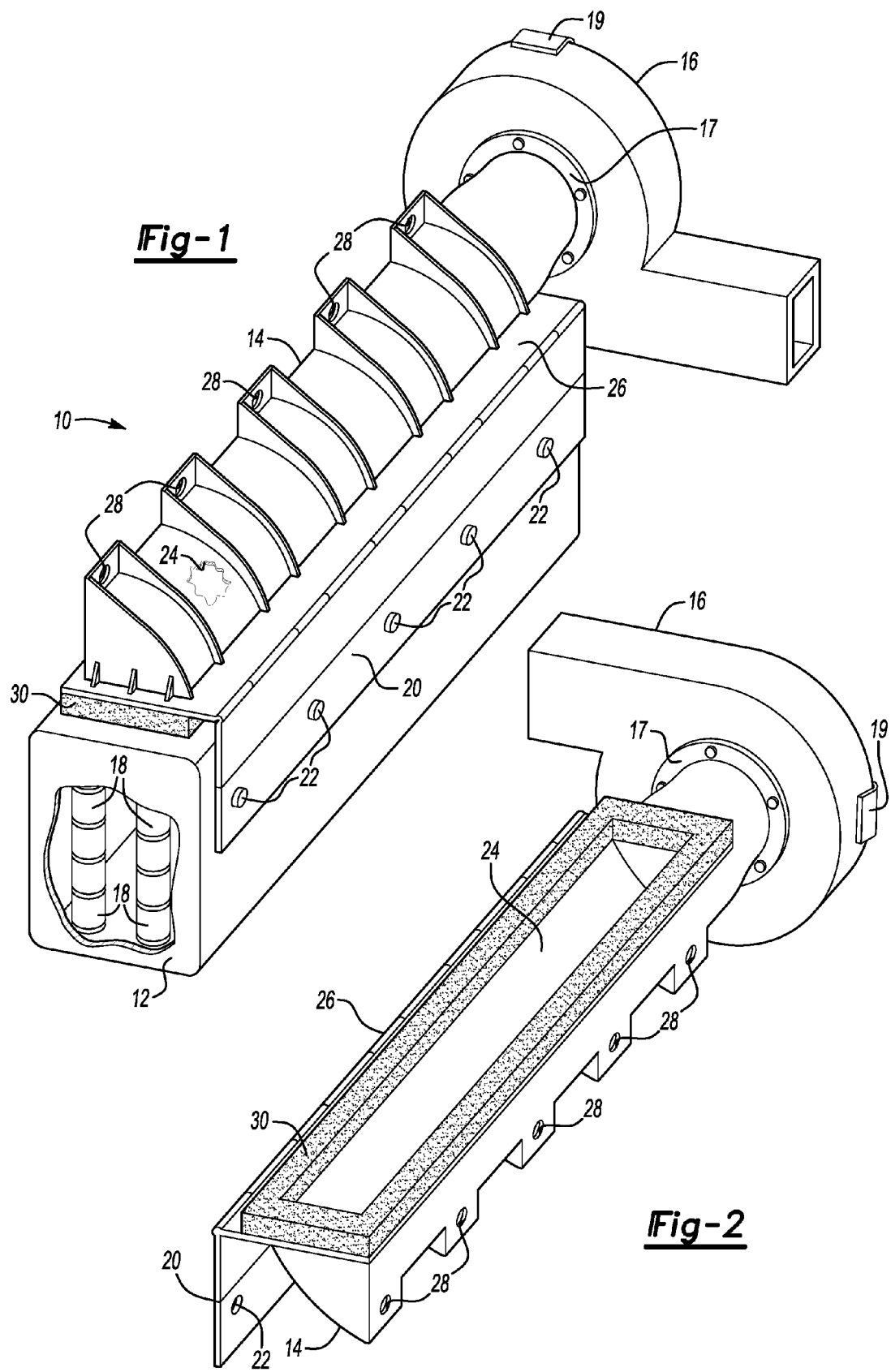

SYSTEM FOR COOLING A VEHICLE BATTERY AND METHOD OF INSTALLING SAME

BACKGROUND

1. Field of the Invention

The invention relates to systems for cooling vehicle batteries and methods of installing the same.

2. Discussion

An alternatively powered vehicle, e.g., hybrid electric vehicle, may include a high voltage battery and a forced air thermal management system to cool the high voltage battery. This high voltage battery may be located, for example, under or behind a rear seat of the vehicle. Packaging constraints may limit the ways in which the high voltage battery and portions of the thermal management system are put into the vehicle.

SUMMARY

Embodiments of the invention may take the form of a system for cooling a battery. The system includes a duct connected with the battery and moveable between decking and securing positions relative to the battery.

Embodiments of the invention may take the form of a system for cooling electrochemical cells of a power storage unit for a vehicle. The system includes a power storage unit enclosure to contain the electrochemical cells and a duct including a mounting plate connected with the power storage unit enclosure. The duct is moveable between unassembled and assembled positions relative to the power storage unit enclosure. The duct is in fluid communication with the power storage unit enclosure so as to direct a conditioning fluid for the electrochemical cells if the duct is in the assembled position.

Embodiments of the invention may take the form of a method for installing a battery assembly for a vehicle. The method includes loading the battery assembly into the vehicle when the duct is in a decking position, moving the duct from the decking position to a securing position, and securing the duct.

BRIEF DESCRIPTION OF THE DRAWINGS

FIG. 1 is a rear perspective view of an example battery assembly for an alternatively powered vehicle.

FIG. 2 is a bottom perspective view of the duct, seal, and fan of FIG. 1.

DETAILED DESCRIPTION

Figure 3:
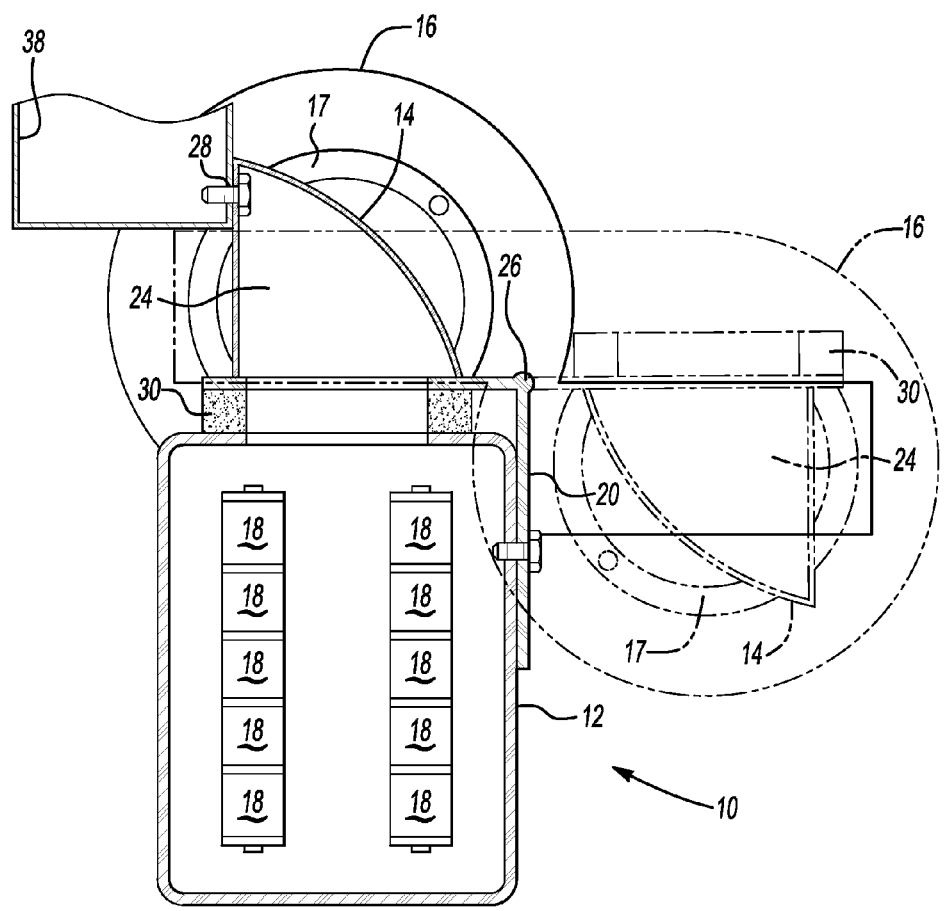
FIG. 3 is a schematic diagram, in cross-section, of the battery assembly of FIG. 1.

Some embodiments of the invention provide a duct partially secured to a battery prior to it being in a vehicle. Once in the vehicle, the duct is completely secured. When partially secured, the duct is moveable relative to the battery via a connector to facilitate loading of the battery and duct into the vehicle. When completely secured, the duct and battery establish a substantially air tight seal.

The connector may allow the duct to include, for example, two types of attachments: (i) those that are not accessible in vehicle position, e.g., those that are secured prior to vehicle installation such as those that hold the duct to the battery, and (ii) those that are accessible in vehicle position, e.g., those that are secured after vehicle installation such as those that hold the duct to the vehicle. The connector may further allow the duct to be rotated out of driver and passenger space. For example, a duct and fan may be tucked underneath a package tray to increase cargo volume of a trunk.

The duct may be designed such that when the fasteners that hold the duct to the battery are secured, the duct rests in a position that does not increase the profile of the battery relative to the final decking position. This may facilitate the insertion of the battery and duct into a vehicle. For example, the battery and duct in the decking position are inserted into an opening behind a rear seat of a vehicle. Once decked, it may be secured to the vehicle.

Some embodiments provide a lever retention feature for a seal between a duct and a battery. When secured, the duct compresses the seal relative to the battery thus forming a substantially air tight seal between the duct and battery. For example, the duct may include attachment features that mate with a back side of a package tray of a vehicle. Securing the attachment features to the package tray induces a moment about a connector of the duct that compresses the seal against the battery.

FIG. 1 is a rear perspective view of battery assembly 10. In the embodiment of FIG. 1, battery assembly 10 is located behind a rear seat of a vehicle (not shown). Battery assembly 10, however, may be located as desired within the vehicle, e.g., next to an engine, etc. Battery assembly 10 of FIG. 1 includes battery box 12, plenum 14, fan 16, and battery cells 18. In the embodiment of FIG. 1, plenum 14 is shown in an exhaust configuration, e.g., downstream of battery box 12. Plenum 14, however, may be located upstream, or otherwise as desired, of battery box 12.

Plenum 14 includes collar 17. In the embodiment of FIG. 1, plenum 14 is attached, e.g., bolted, with fan 16 via collar 17 and fan 16 is attached with the vehicle (not shown) at tab 19. In some alternative embodiments, fan 16 may located, for example, at an entrance of battery box 12 to push air into battery box 12. In other alternative embodiments, any active or passive air pump, e.g., turbine, venturi tube, etc., may be connected with duct 16 and/or battery box 12 to move air through battery box 12.

Fan 16 pulls air, for example, from a cabin of the vehicle (not shown) into battery box 12 to cool battery cells 18. The air passes out of battery box 12 and into plenum 14. Plenum 14 guides the air into fan 16 which then exhausts it into, for example, a trunk of the vehicle (not shown).

Plenum 14 includes hinge plate 20. Plenum 14 is attached to battery box 12 with, for example, screws at openings 22, e.g., screw holes, of hinge plate 20. In some alternative embodiments, hinge plate 20 may be attached to battery box 12 with, for example, bolts or push pins, etc. In other alternative embodiments, hinge plate 20 may be integrated with battery box 12, e.g., battery box 12, hinge 26, and plenum 14 are molded as one piece. Plenum 14 also includes a cavity 24 through which air from battery box 12 flows to fan 16. Cavity 24 is connected with hinge plate 20 via hinge 26, e.g., living hinge. As discussed below, cavity 24 may be moved, e.g., rotated, about hinge 26.

Plenum 14 is attached, e.g., bolted, screwed, pinned, etc., with a package tray of the vehicle (not shown) at attachment points 28. In alternative embodiments, plenum 14 may be attached, e.g., bolted, screwed, pinned, etc., with battery box 12 instead of with the vehicle.

Seal 30, e.g., foam, gasket, etc., provides a substantially air tight seal between battery box 12 and plenum 14. In the embodiment of FIG. 1, seal 30 compresses as plenum 14 is attached with the vehicle (not shown) at attachment points 28.

FIG. 2 is a bottom perspective view of plenum 14. In the embodiment of FIG. 2, seal 30 is fixed, e.g., adhered, to plenum 14. In alternative embodiments, seal 30 may be fixed with battery box 12.

FIG. 3 is a schematic diagram of battery assembly 10. When loading battery assembly 10 into the vehicle, plenum 14 and fan 16 are in the position shown in phantom line. This loading position allows battery assembly 10 to be loaded into the vehicle through limited access passageways, e.g., a door opening, a rear seat pass through to a trunk. Once loaded into the vehicle, plenum 14 and fan 16 may be moved, e.g., rotated, about hinge 26 into the position shown in solid line. This final position allows plenum 14 to mate with battery box 12 such that, as described above, air from battery box 12 may flow into cavity 24 of plenum 14. Plenum 14 is then attached, e.g., pinned, screwed, etc., to package tray 38 of the vehicle.

In the embodiment of FIG. 3, package tray 38 may prevent the loading of battery assembly 10 into the vehicle through a door opening (not shown) if plenum 14 and fan 16 are in the final position. In other embodiments, other vehicles may present different packaging constraints that make it advantageous to load battery assembly 10 into the vehicle in the loading position.

Figure 4:
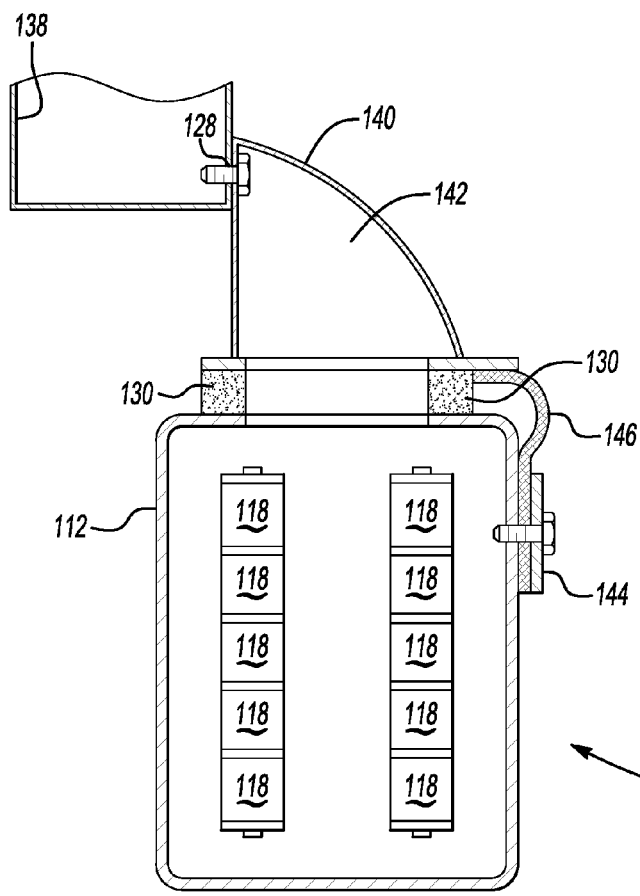
FIG. 4 is a schematic diagram, in cross-section, of another example battery assembly for an alternatively powered vehicle.

FIG. 4 is a schematic diagram of battery assembly 110. Numbered elements differing by factors of 100 have similar, although not necessarily identical, descriptions, e.g., battery boxes 12, 112. Duct 140 includes air passage 142 that receives air from battery box 112. Duct 140 includes attachment plate 144 secured, e.g., fastened, adhered, etc., to battery box 112. Prior to the attachment, e.g., bolting, etc., of duct 140 to package tray 138 at attachment points 128, air passage 142 may be moved, as described above, between the loading and post-loading positions via flexible connector 146, e.g., webbing, fabric, tape, etc.

In the embodiment of FIG. 4, flexible connector 146 is bonded, e.g., adhered, with duct 140 and attachment plate 144. In some alternative embodiments, flexible connector 146 may be mechanically fastened, e.g., riveted, bolted, etc., with duct 140 and attachment plate 144. In other alternative embodiments, flexible connector 146 may be attached with duct 140 and attachment plate 144 as desired, e.g., temporarily.

Figure 5:
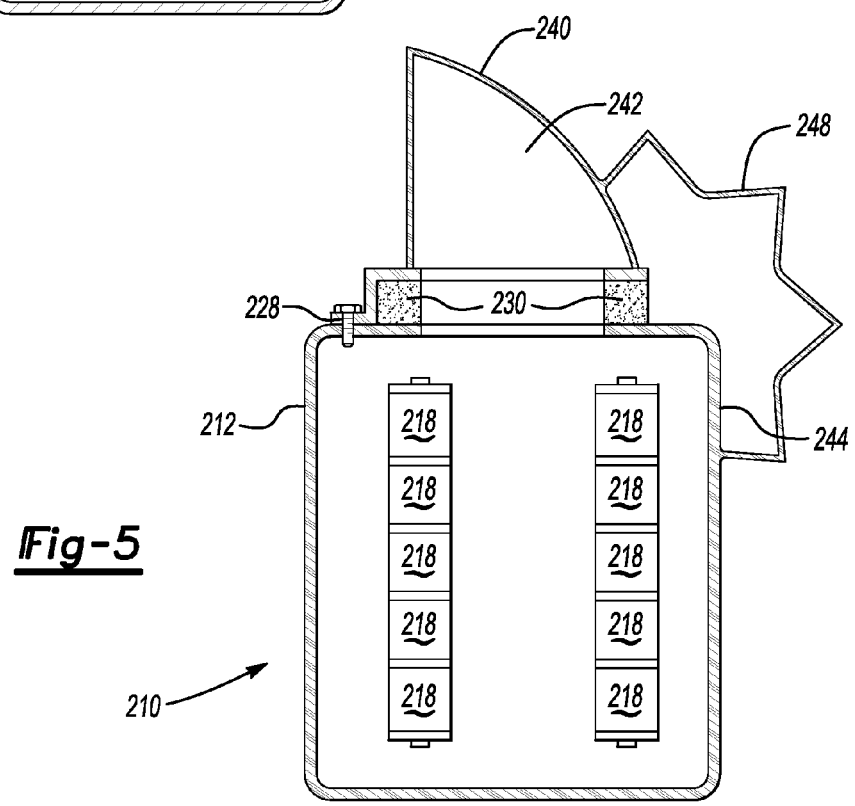
FIG. 5 is a schematic diagram, in cross-section, of yet another example battery assembly for an alternatively powered vehicle.

FIG. 5 is a schematic diagram of battery assembly 210. Prior to the attachment, e.g., screwing, etc., of duct 240 to battery box 212 at attachment points 228, air passage 242 may be moved, as described above, between the loading and post-loading positions via flexible convolute 248.

In the embodiment of FIG. 5, flexible convolute 248 is molded as one piece with battery box 212 and duct 240. In alternative embodiments, flexible convolute 248 may be mechanically fastened or otherwise attached, e.g., screwed, bolted, etc., with duct 240 and battery box 212.

Figure 6:
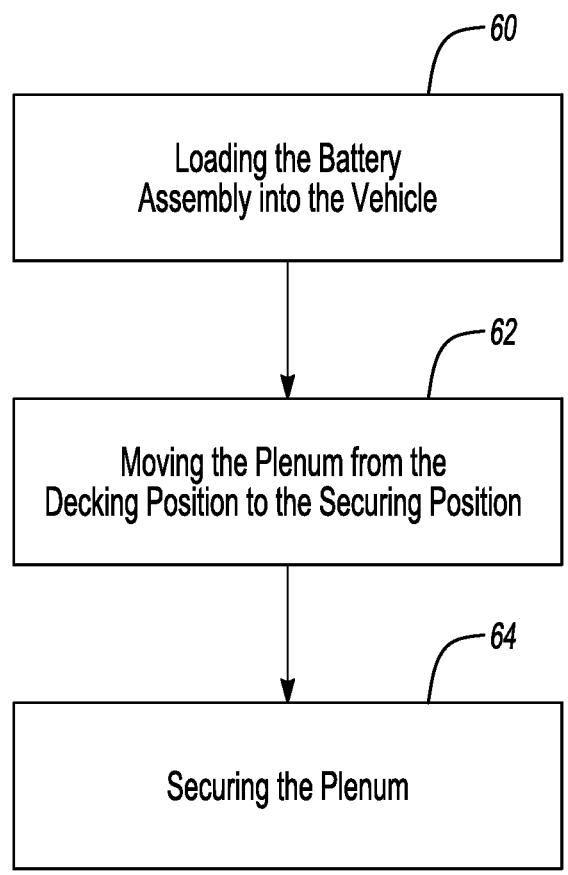
FIG. 6 is a flow chart of an example method for loading a battery assembly into a vehicle.

FIG. 6 is a flow chart of an example method for loading battery assembly 10 into a vehicle. At 60, battery assembly 10 is loaded into the vehicle. At 62, plenum 14 is moved from the decking position to the securing position. At 64, plenum 14 is secured.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A system for cooling a battery of an automotive vehicle comprising:
    a battery to power the automotive vehicle;
    a duct connected with the battery, moveable between decking and securing positions relative to the battery, and configured to direct air the battery when in the securing position; and
    an air pump having an outlet portion in fluid communication with the duct, and moveable between decking and securing positions.

2. The system of claim 1 wherein the duct is connected with the battery via a living hinge.

3. The system of claim 1 wherein the duct is connected with the battery via a flexible convolute.

4. The system of claim 1 wherein the duct is connected with the battery via a webbing.

5. The system of claim 1 wherein the duct is connected with the battery via a fabric.

6. The system of claim 1 wherein the duct is connected with the battery via a tape.

7. The system of claim 1 further comprising an air pump attached with the duct and moveable between the decking and securing positions relative to the battery.

8. The system of claim 1 further comprising a seal to reduce air leakage between the battery and duct.

9. A system for cooling electrochemical cells of a power storage unit for an automotive vehicle, the system comprising:
    a power storage unit enclosure to contain the electrochemical cells, the electrochemical cells for powering the automotive vehicle;
    a duct including a mounting plate connected with the power storage unit enclosure, wherein the duct is moveable between unassembled and assembled positions relative to the power storage unit enclosure and is configure to direct a conditioning fluid at the electrochemical cells when in the assembled position; and
    an air pump having an outlet portion in fluid communication with the duct, and moveable between the unassembled and assembled positions.

10. The system of claim 9 wherein the duct further includes a living hinge and wherein the duct is moveable between the unassembled and assembled positions via the living hinge.

11. The system of claim 9 wherein the duct further includes a flexible convolute and wherein the duct is moveable between the unassembled and assembled positions via the flexible convolute.

12. The system of claim 9 wherein the duct further includes a webbing and wherein the duct is moveable between the unassembled and assembled positions via the webbing.

13. The system of claim 9 wherein the duct further includes a fabric and wherein the duct is moveable between the unassembled and assembled positions via the fabric.

14. The system of claim 9 wherein the duct further includes a tape and wherein the duct is moveable between the unassembled and assembled positions via the tape.

15. The system of claim 9 further comprising an air pump attached with the duct and moveable between the unassembled and assembled positions relative to the power storage unit enclosure.

\* \* \* \* \*

UNITED STATES PATENT AND TRADEMARK OFFICE
CERTIFICATE OF CORRECTION

| | | |
|---|---|---|
| PATENT NO. | : 8,895,171 B2 | Page 1 of 1 |
| APPLICATION NO. | : 11/876965 | |
| DATED | : November 25, 2014 | |
| INVENTOR(S) | : Patrick Daniel Maguire et al. | |

It is certified that error appears in the above-identified patent and that said Letters Patent is hereby corrected as shown below:

IN THE CLAIMS:

Column 4, Line 11, Claim 1:

After "configured to direct air"
Insert -- at --.

Column 4, Line 14, Claim 1:

After "moveable between"
Insert -- the --.

Signed and Sealed this
Fifth Day of May, 2015

Michelle K. Lee
*Director of the United States Patent and Trademark Office*